United States Patent [19]

Kishi

[11] 4,292,557
[45] Sep. 29, 1981

[54] MOTOR WITH INTEGRAL CLUTCH

[75] Inventor: Yoshio Kishi, Hachiouji, Japan

[73] Assignee: Sony Corporation, Tokyo, Japan

[21] Appl. No.: 35,506

[22] Filed: May 2, 1979

[30] Foreign Application Priority Data

May 10, 1978 [JP] Japan ................................. 53-55378
May 10, 1978 [JP] Japan ................................. 53-55379

[51] Int. Cl.³ ............................................. H02K 7/10
[52] U.S. Cl. ..................................... 310/78; 310/156; 310/268
[58] Field of Search .............................. 310/76–78, 310/156, 268, 7 A

[56] References Cited

U.S. PATENT DOCUMENTS 3,732,447  5/1973  Perhats ................................. 310/76
3,819,966  6/1974  Noguchi ............................ 310/78 X
3,845,339 10/1974  Merkle et al. ...................... 310/156

Primary Examiner—Donovan F. Duggan
Attorney, Agent, or Firm—Lewis H. Eslinger; Alvin Sinderbrand

[57] ABSTRACT

A flat drive motor, operative to transmit torque from a rotor to a drive shaft uses the attraction of a rotor magnet for a magnetic material to apply a fixed normal force to an integral friction clutch. When overloaded, the friction clutch slips with a controlled friction proportional to the normal force to prevent the development of excessive torque and to permit the rotor to turn at a normal speed while the drive shaft is slowed or stopped to prevent excessive current in the motor drive coils.

8 Claims, 10 Drawing Figures

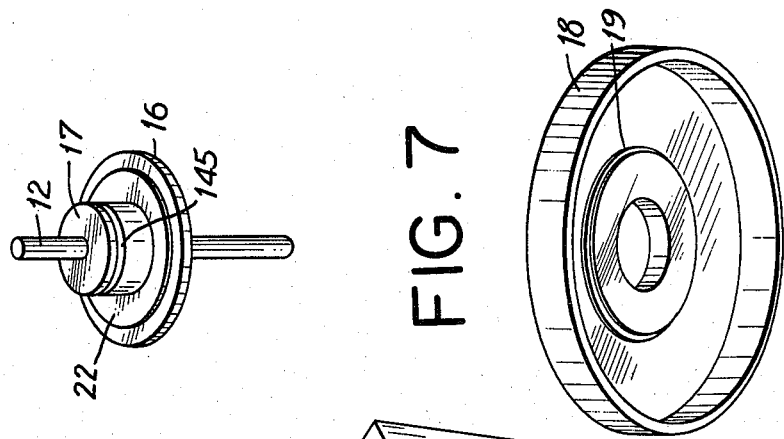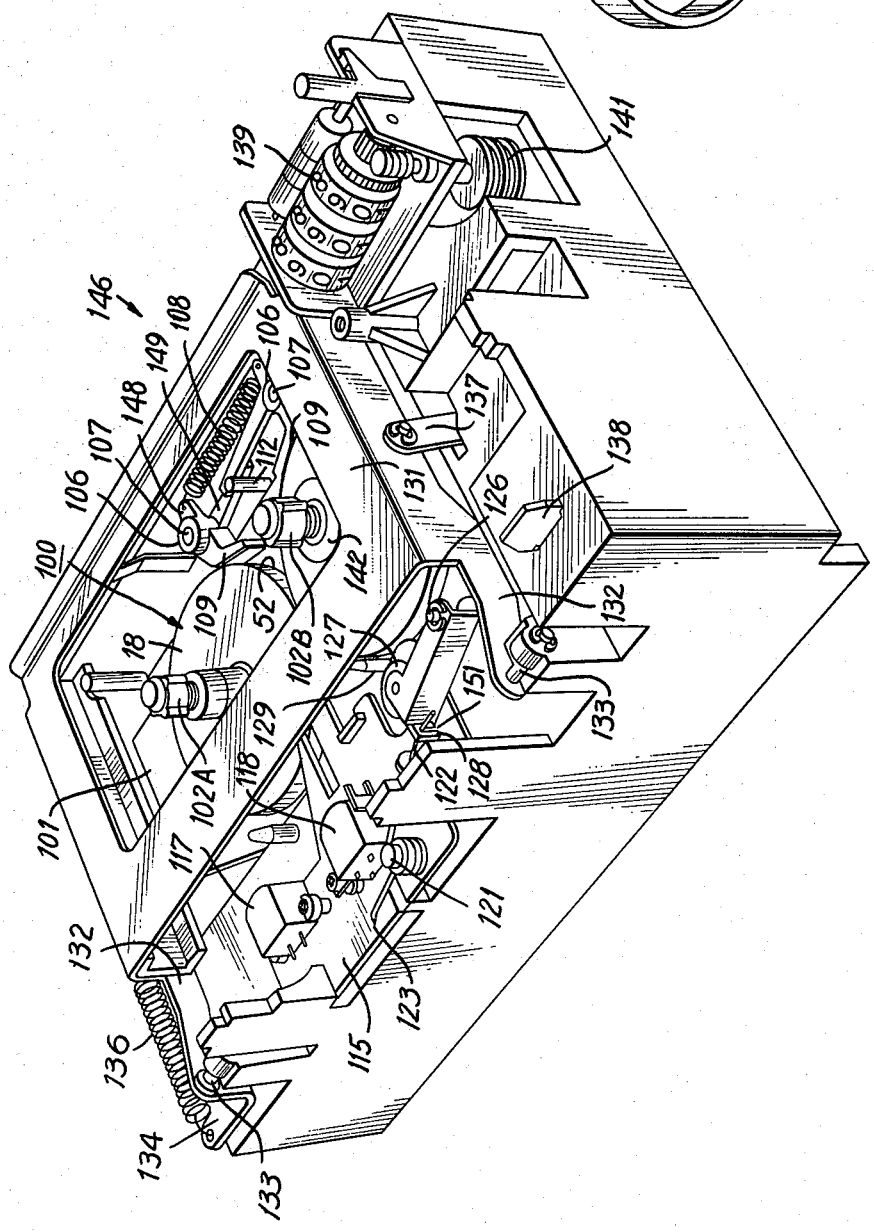

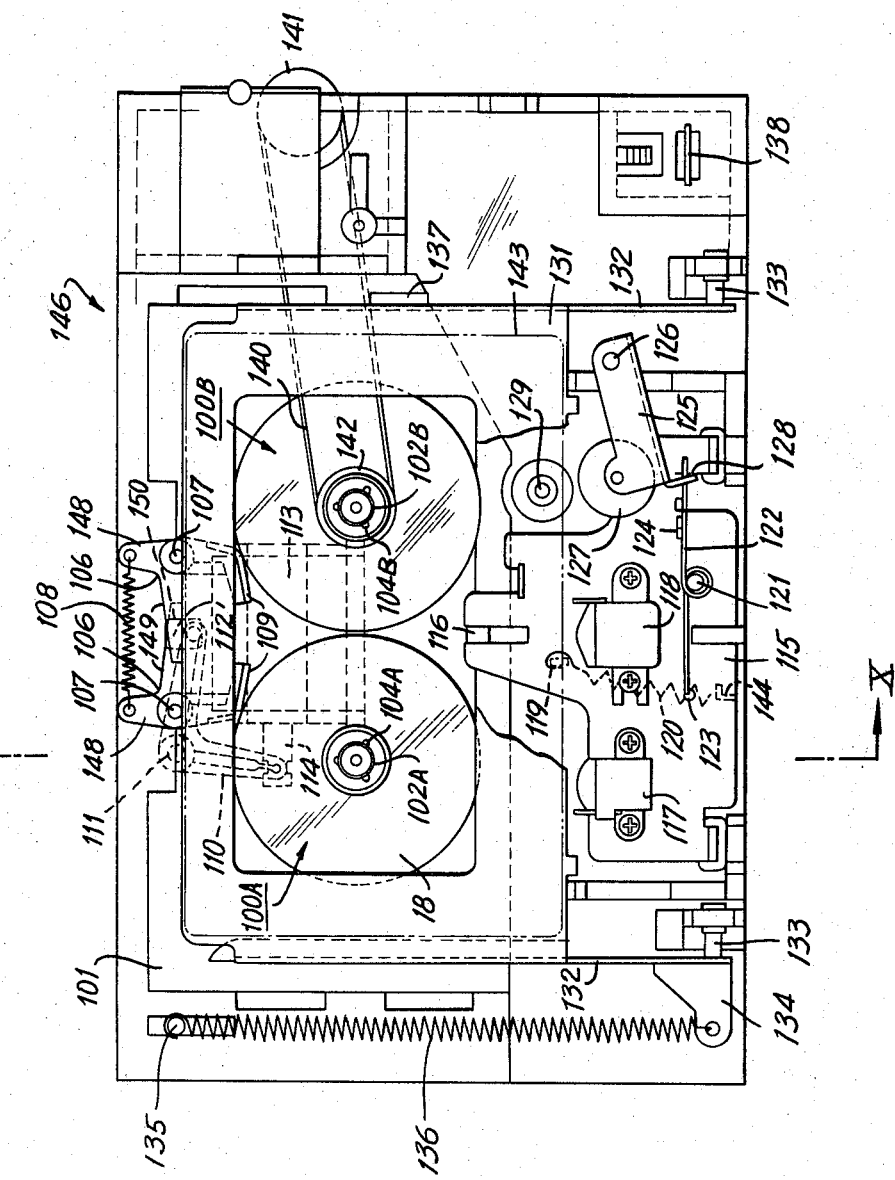

MOTOR WITH INTEGRAL CLUTCH

BACKGROUND OF THE INVENTION

This invention relates to a motor for applying a driving torque to a drive shaft.

More particularly, this invention relates to an electric motor adapted for direct drive of a take-up reel in a tape recorder.

In an electric motor in which a rotating magnetic field produced by driving coils interacts with a rotor magnet to produce a torque, excessive load can cause such a large electric current in the driving coils that heating and possible coil burnout can occur. Furthermore, the torque which can be produced by such a motor can exceed a desired maximum torque.

These problems are especially severe in a direct drive reel motor used, for example, to drive a take-up reel in a cassette tape recorder. When the end of the tape is reached on the supply reel, the take-up reel, driven by the reel motor, is suddenly stopped and may remain in this condition for an extended period in some equipment. Thus, a direct drive reel motor connected to the take-up reel may experience extreme and long sustained overload. If the rotor of the reel motor is stalled by such overload, high values of current can heat and damage its drive coils. In addition, the available torque exerted on the take-up reel can apply such an excessive force to the tape at the hub of the supply reel that the tape may be broken.

A need exists therefore for a novel motor which is not damaged by overload and which does not develop excess torque.

SUMMARY OF THE INVENTION

It is an object of the present invention to provide a motor having means to prevent burning out the driving coils even if an overload is placed on the drive shaft.

It is another object of the present invention to provide a motor capable of applying a constant torque to an external load.

It is yet another object of the present invention to provide a motor having a friction clutch for transmitting torque from a rotor to a drive shaft in which magnetic attraction between a rotor magnet and a magnetic material provides a normal force to friction clutch members to thereby simplify and miniaturize the motor and clutch.

It is a further object of the present invention to provide a motor adapted to driving a tape reel in a tape recorder.

According to an aspect of the invention, there is provided a motor which comprises a stator yoke having magnetic material therein, a rotor including a rotor magnet rotatably disposed in opposition to the stator yoke, whereby a magnetic attraction is produced therebetween, driving coil means adjacent to the rotor magnet for generating a rotating magnetic field and thereby urging the rotor magnet to rotate, a first clutch member, desirably formed, at least in part, by a part of the rotor secured to the rotor magnet, a drive shaft, a second clutch member secured to the drive shaft, and frictional coupling means disposed between the first clutch member and the second clutch member and being effective to transmit a torque from the rotor magnet to the drive shaft which has a maximum value proportional to the magnetic attraction produced between the stator yoke and the rotor magnet.

The above, and other objects, features and advantages of the present invention will become apparent from the following description read in conjunction with the accompanying drawings in which like reference numerals designate the same elements.

BRIEF DESCRIPTION OF THE DRAWINGS

FIG. 6 is a perspective view of a motor drive shaft and associated clutch member suitable for use in the embodiment of FIG. 1;

FIG. 7 is a perspective view of a rotor constituting another clutch member suitable for use in the embodiment of FIG. 1;

FIG. 8 is an external perspective view of a cassette tape recorder which includes motors according to the present invention, and which is shown with the casing of the cassette tape recorder removed to show parts in the interior;

FIG. 9 is a top plan view of the cassette tape recorder as shown on FIG. 8; and

DETAILED DESCRIPTION OF THE PREFERRED EMBODIMENTS

Figure 1:
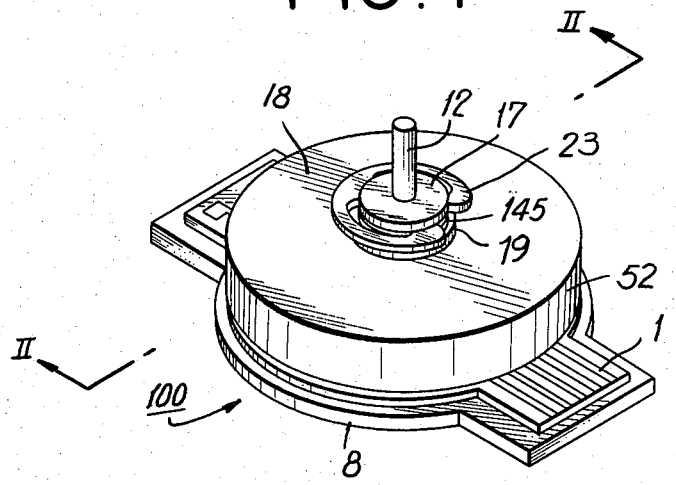
FIG. 1 is a perspective view of a motor according to an embodiment of the present invention.
Figure 2:
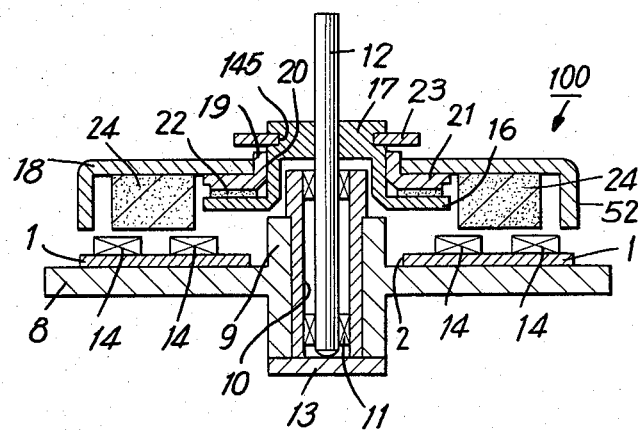
FIG. 2 is a sectional view taken along II—II on FIG. 1.
Figure 3:
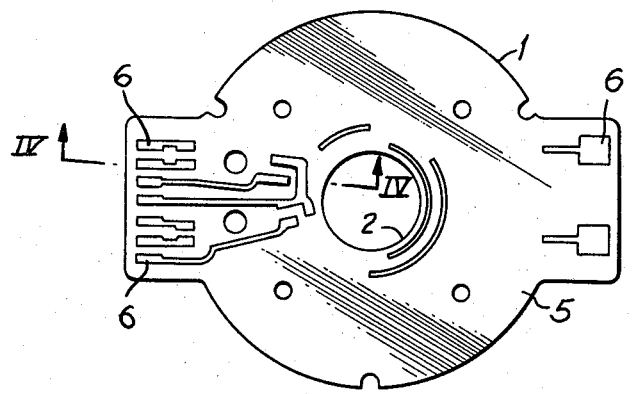
FIG. 3 is a plan view of a stator yoke base plate suitable for use in the embodiment of FIG. 1, and which is shown with an insulating layer removed for illustrating an underlying printed circuit.
Figure 4:
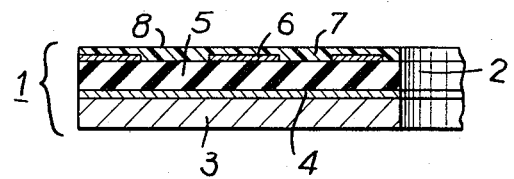
FIG. 4 is an enlarged, fragmentary sectional view taken along the line IV—IV on FIG. 3.

Referring to FIGS. 1 and 2, a flat-type motor 100 according to this invention is shown to include a base plate 1 having a hole 2 centrally located therein. Referring now also to FIGS. 3 and 4, base plate 1, which functions as a stator yoke for motor 100, includes a layer or plate 3 of magnetic material having overlaid thereon an insulating layer or plate 5 attached or bonded thereto by any suitable means such as by an adhesive layer 4. Magnetic material 3 is preferably ferromagnetic material for improved magnetic efficiency and is most preferably made up of stacked lamellae of silicon steel for reduction of eddy currents therein.

A wiring pattern 6 on insulating plate 5 may be formed by any conventional means such as by printing but is preferably formed by etching undesired portions of a copper foil bonded to the surface of insulating plate 5 to leave wiring pattern 6 thereon. A further insulating layer 7 may be applied over wiring pattern 6. The insulating layer 7 may have openings or vias therethrough at appropriate locations to permit the connection by soldering or otherwise of electric leads to wiring pattern 6.

A boss portion 9 (FIG. 2) on a mounting board 8 passes through hole 2 in base plate 1 which is suitably secured to board 8. Bearings 11, fitted in a central hole 10 of boss portion 9, rotatably support a motor drive shaft 12. A thrust bearing 13, secured to the lower end of boss portion 9, supports drive shaft 12 against downward force.

A clutch member 17 having a generally circular clutch flange 16 at its lower end is secured by any convenient means such as by press-fit, to a medial part of motor drive shaft 12 for unitary rotation therewith. A rotor 18, also shown individually in FIG. 7, is made of a ferromagnetic material to form another clutch member and has a clutch bushing 19 secured in the lower side of a central hole for unitary rotation with rotor 18. Clutch bushing 19 is preferably formed of a low friction material such as polycarbonate, and has a center hole or bore 20 in which clutch member 17 fits loosely so that they make sliding contact with each other. A generally circular clutch flange 21 of clutch bushing 19 is opposed to clutch flange 16 of clutch member 17. A friction ring 22 of a material having a stabilized friction coefficient such as, for example, high-density polyethylene, is disposed between opposed clutch flanges 16 and 21. A retaining member, such as a C-washer or Cir-clip (trademark) 23, is fitted into a groove 145 in the outer periphery of clutch member 17, to prevent axial removal of rotor or clutch member 18 from clutch member 17.

A ring-shaped rotor magnet 24 (FIG. 2) having a plurality of magnetic poles, for example 8 poles, of alternating polarities is secured to the underside of rotor 18 by any convenient means such as by bonding. Rotor magnet 24 is disposed in opposition to the base plate 1 and a dependent perimeter 52 of rotor 18 encloses rotor magnet 24 and its extremity extends close to base plate 1.

Figure 5:
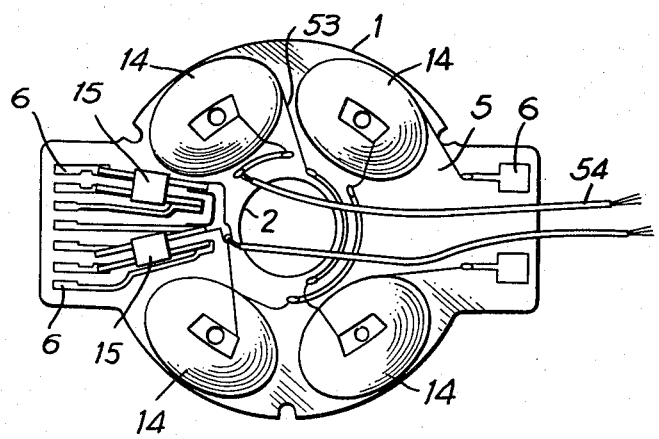
FIG. 5 is a view similar to that of FIG. 3, but showing the stator yoke base plate with driving coils and sensing elements mounted thereon.

A plurality of driving coils 14 (FIGS. 2 and 5) are mounted by any convenient means on base plate 1, and coil leads 53 connect the coils 14 by any convenient means, such as by soldering, to wiring pattern 6. Although four driving coils 14 are shown in FIG. 5, it would be clear to one skilled in the art that more or less than this number could be provided without departing from the scope of the present invention. External connecting wires 54 are also connected to wiring pattern 6. The outer extremities of wiring pattern 6 form connection pads to which external connection can be made by suitable means, such as, for example, a socket (not shown) into which the protruding portions of base plate 1 may be inserted.

Sensing elements 15, such as Hall effect elements, for sensing the rotational position of rotor magnet 24 and for thereby generating driving signals for driving coils 14, are mechanically retained in predetermined positions by being connected to wiring pattern 6 by any convenient means such as by soldering. Sensing elements 15 are electrically connected to external control circuits (not shown) through wiring pattern 6. The manner in which a brushless motor employing Hall effect sensing elements is driven is well known in the art and will therefore not be further described herein.

The operation of motor 100 is described in the following paragraphs.

Driving current from a drive control circuit (not shown) is supplied to driving coils 14 through wiring pattern 6 and external connecting wires 54. Driving coils 14 are thereby excited in the proper phase to produce a rotating magnetic field which develops a torque in a given direction on rotor magnet 24, whereby rotor 18, secured to rotor magnet 24, is urged to turn. The rotational speed or rotational phase of rotor 18 is detected by sensing elements 15 and may be controlled at constant speed by a feedback control system (not shown) which controls the driving current fed to driving coils 14 in response to the detected output signal.

During normal rotation, clutch bushing 19 and rotor or clutch member 18 rotate integrally with clutch member 17 due to the friction developed between flanges 16 and 21 through friction ring 22. The maximum torque which can be transmitted from rotor 18 to motor drive shaft 12 depends on the coefficient of friction between friction ring 22 and flanges 16 and 21 and on the normal force pressing these elements together. The friction coefficient is determined by the frictional material used in friction ring 22 and on the finish on the surfaces of flanges 16 and 21 which mate with friction ring 22. The normal force is produced by the magnetic attraction between rotor magnet 24 and magnetic material 3 in base plate 1. Drive shaft 12 affixed to clutch member 17 thus normally integrally rotates with clutch member or rotor 18. The magnitude of frictional resistance produced by the above magnetic attraction acting through friction ring 22 is chosen according to the maximum torque it is desired to apply to drive shaft 12.

When the load on drive shaft 12 exceeds the maximum torque which can be transmitted through friction ring 22, clutch members 17 and 18 slip relative to each other. This permits drive shaft 12 to stop or rotate slowly while rotor or clutch member 18 is permitted to turn at normal speed. This avoids the danger of burnout of driving coils 14 which might otherwise occur due to high current flow resulting from a stalled rotor. While drive shaft 12 is stopped or slowed as described, a constant torque continues to be applied thereto from rotor 18 through friction ring 22. Whenever the load exerted on drive shaft 12 returns to normal, integral rotation of drive shaft 12 and rotor 18 is resumed. Thus, not only is motor 100 of the present invention impossible to overload, but it also does not permit the development of torque therefrom in excess of a predetermined maximum. These characteristics make the motor 100 especially suited for use as a reel shaft direct-coupled drive motor for the take-up reel in a cassette tape recorder. In that application, a significant advantage is realized in the prevention of breakage of the end of the magnetic tape due to excess torque.

Figure 10:
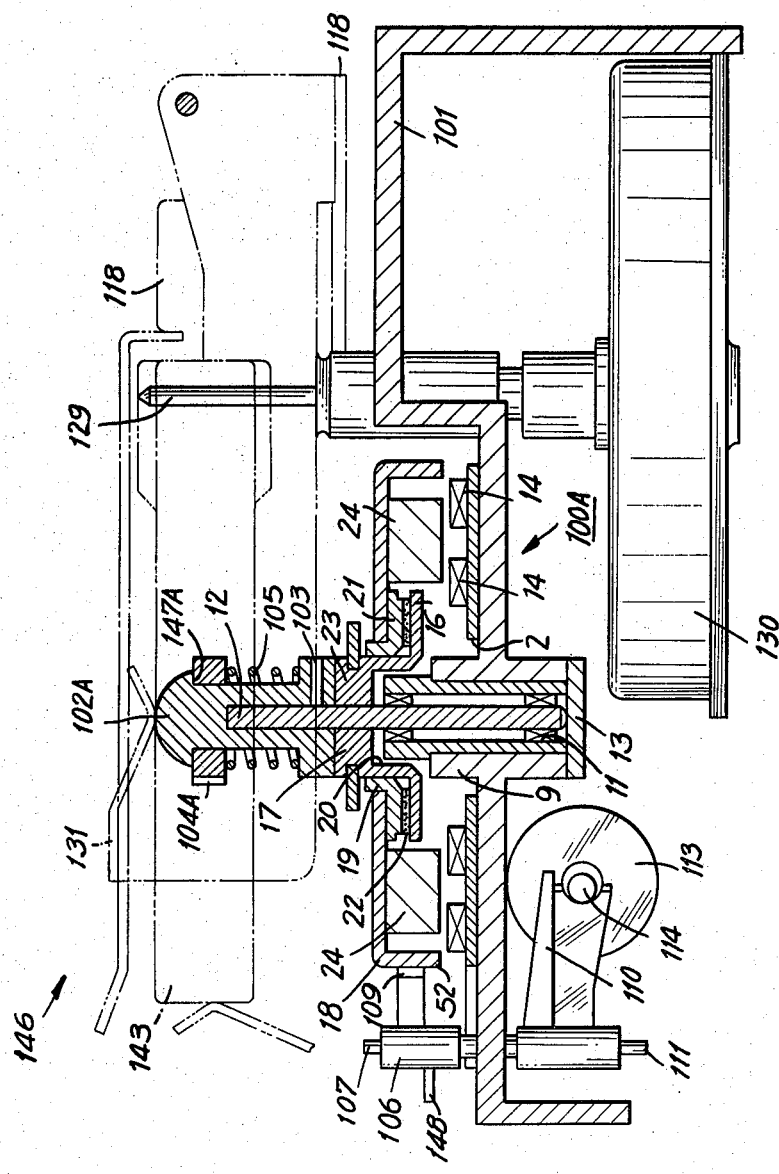
FIG. 10 is a sectional view taken along the line X—X on FIG. 9.

FIGS. 8-10 show an embodiment of a cassette tape recorder 146 including reel motors 100A and 100B which are identical to the above-described flat type motor 100. Since each of reel motors 100A, 100B is identical to flat type motor 100 shown in FIGS. 1-7, like reference numerals indicate like parts and a detailed description thereof is omitted. As used herein the term cassette tape recorder refers to an apparatus for magnetically recording and/or reproducing material on a magnetic tape contained in a cassette.

A chassis base plate 101 of cassette tape recorder 146 includes boss portions 9 (FIG. 10) corresponding to boss portions 9 in FIG. 2 at two symmetrical positions for mounting motors 100A and 100B. Stator yoke base plates 1 for motors 100A and 100B are secured on chassis base plate 101.

A reel drive shaft 102A is secured, conveniently by a set screw 103, to drive shaft 12 of reel motor 100A. A reel stopper member 104A is loosely disposed on reel drive shaft 102A. Reel stopper member 104A is axially slidable on reel drive shaft 102A but is constrained to rotate integrally therewith. A spring 105 urges reel stopper member 104A toward the top end of reel drive shaft 102A where it is opposed by an abutment 147A.

It will be noted that a similar reel drive shaft 102B having a reel stopper member 104B is also secured to the drive shaft of reel motor 100B.

A pair of brake levers 106 are rotatably mounted on respective pivots 107 symmetrically attached to chassis base plate 101. Each brake lever 106 has three arms. A brake arm or shoe 109 on each brake lever 106 is disposed adjacent rotor 18 of the respective reel motor 100A or 100B. Second arms 148 of brake levers 106 lie substantially parallel to each other and are urged toward each other by a spring 108 between their ends. Spring 108 urges rotation of brake levers 106 in a direction to produce frictional contact between brake shoes 109 and dependent perimeters 52 of respective rotors 18 of reel motors 100A, 100B. Crank arms 149 of brake levers 106 extend toward each other from respective pivots 107 and overlap at their free end portions. An L-shaped lever 110 is rotatably mounted on a pivot 111 on the underside of chassis base plate 101. A pin 112 (FIG. 9) in one end of L-shaped lever 110 projects through an opening 150 in chassis base plate 101 and contacts the overlapped end portions of the two crank arms 149. The other end of L-shaped lever 110 is hingedly attached to an armature 114 of a solenoid 113 which is actuated for each mode of recorder operations, such as playback, recording, fast forward and fast rewind. In response to such actuation or energization of solenoid 113, lever 110 is turned in the counter-clockwise direction, as viewed on FIG. 9, so that pin 112 turns brake levers 106 in the directions spacing brake shoe 109 from the respective rotors 18.

A head base plate or carriage 115 is slidable in the vertical direction, as viewed on FIG. 9, toward and away from a tape cassette 143, and is guided in such movement by a guide protuberance 116 or other means on chassis base 101. An erasing head 117 and a recording/reproducing head 118 are mounted on head base 115. A lug 119, formed by bending downward a part of the head base plate 115, extends through a hole (not shown) in chassis base plate 101. A spring 120 on the underside of chassis base plate 101 is connected between lug 110 and a protuberance 144 on the underside of chassis base plate 101. Spring 120 urges head base 115 downwardly in FIG. 9, that is, in the direction moving heads 117 and 118 away from cassette 143.

A pin 121 supporting a coil spring 122 is affixed to head base plate 115. One end of coil spring 122 is bent downward and passes through a hole 123 formed in the head base plate 115, and the other end portion of coil spring 122 is urged against an abutment 124 on plate 115. An arm 125 is pivotably mounted at one end on a pivot 126 affixed to chassis base plate 101. A pinch roller 127 is rotatably mounted at the other end of arm 125. Arm 125 has a bent portion 128 at such other end formed with a slot 151 (FIG. 8) therein adapted to engage the other end of spring 122. Thus, with head base plate 115 in its inactive position shown on FIG. 9, roller 127 is held away from a capstan 129 by coil spring 122 which is constrained from further motion by contact with abutment 124. The capstan 129 is directly coupled to a shaft of a motor 130 (FIG. 10) mounted on the underside of chassis base plate 101.

As shown, the cassette tape recorder 146 may have a cassette holder 131 with support plates 132 dependent from its sides which are hinged to respective pivots 133 on chassis base plate 101. Cassette holder 131 can be opened at the side facing upward on FIG. 9 by pivoting on pivots 133. A spring 136 between a lobe 134 on one of support plates 132, and a protuberance 135 on chassis base plate 101 urges cassette holder 131 into its open position against the restraint of a conventional latch (not shown). A conventional operating element 137 for holder 131 is shown to the right of cassette holder 131. A cassette eject operating bar 138 may be movable horizontally on the right side of the lower part of base plate 101, to control the conventional latch (not shown) which normally maintains cassette holder 131 in the illustrated closed position, but which may be released in response to actuation of bar 138 to permit spring 136 to move holder 131 to its opened position.

A tape counter 139 is driven by a driving belt 140 passing over a pulley 141 of tape counter 139 and a pulley 142 associated with reel drive shaft 102B.

Cassette recorder 146 has two types of operating modes namely a record/reproduce mode and a fast forward/fast rewind mode. For establishing the record/reproduce mode after holder 131 has been moved to its closed or operative position with a cassette 143 therein, power and record or reproduce controls (not shown) are operated to apply power to motor 130 and to reel motor 100B associated with the take-up reel shaft 102B. Head base plate 115 is moved into its operative position toward tape cassette 143 against the force of spring 120 thus placing heads 117 and 118 into contact with the magnetic tape in tape cassette 143 and causing spring 122 to force pinch roller 127 against capstan 129 with the magnetic tape therebetween. An amount of overtravel of head base 115 is provided whereby the opposition of capstan 129 to pinch roller 127 forces coil spring 122 away from abutment 124. Armature 114 of solenoid 113 is drawn into solenoid 113. The resulting rotation of L-shaped lever 110, transmitted through pin 112 to the overlapped portions of arms 149, rotates brake levers 106 to move their brake shoes 109 out of frictional contact with rotors 18 of reel motors 100A and 100B thus freeing rotors 18 for rotation. Capstan 129 is driven at constant speed by motor 130 and drives the magnetic tape at constant speed while reel motor 100B on the take-up side of capstan 129 is driven as previously described to wind up the tape on its associated reel. The reel motor 100A on the feed or supply side of capstan 129 may remain unpowered to passively pay out tape from its reel to capstan 129.

When the end of the magnetic tape is reached on the supply reel, the magnetic tape is suddenly stopped while take-up reel motor 100B may continue to attempt to drive at normal speed. Although the take-up reel is immediately brought to a stop, rotor 18 on the take-up side reel motor 100B can continue to turn even though its drive shaft 12 is stopped. Due to the controlled maximum torque which can be transmitted through friction 22, no danger of tape breakage or motor overload occurs.

In the fast forward/fast rewind mode, head base 115 normally remains in its inoperative position shown in FIG. 9 while armature 114 of solenoid 113 disengages brake shoes 109 from frictional contact with rotors 18 of reel motors 100A and 100B. Driving signals, applied to the appropriate one of reel motors 100A and 100B, rotates its associated reel at high speed. When the end of the magnetic tape is reached on the feed side or supply reel, the clutch of the driven reel motor 100A or 100B slips to limit the tension applied to the magnetic tape to a value below that at which breakage can occur.

The operating mode which tends to apply the greatest tension to the magnetic tape is the fast forward/fast rewind mode due to the higher speeds involved and the suddenness with which the tape is stopped. The effective torque limit established by the friction clutches in reel motors 100A and 100B is therefore established in accordance with the requirements of the fast forward/fast rewind mode. Since fast forward and fast rewind speeds are usually about the same, identical motors can usually be used for reel motors 100A and 100B. If the speeds or other constraints are different, the frictional torque of reel motors 100A and 100B can be made different by changing friction rings 22, the finish on flanges 16 and 21 or the magnetic attraction between rotor magnets 24 and their associated magnetic materials 3.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A motor comprising:
    a drive shaft mounted for rotation about its longitudinal axis;
    a stator yoke extending radially in respect to said axis and containing magnetic material;
    a rotor assembly mounted for rotation about said axis and for movement in the direction of said axis relative to said stator yoke, said rotor assembly including a rotor magnet which is in opposing relation to said stator yoke in said direction of the axis and which produces a magnetic attraction therebetween tending to move said rotor magnet in said direction toward said stator yoke;
    driving coil means on said stator yoke for generating a rotating magnetic field interacting with said rotor magnet so as to urge said rotor assembly to rotate; and
    first and second clutch members secured to said rotor magnet and said drive shaft, respectively, and having portions which are in opposing relation to each other in said direction of the axis and which are urged to frictionally engage each other by movement of said rotor magnet in said direction toward the stator yoke in response to said magnetic attraction, whereby to transmit a torque from said rotor magnet to said drive shaft which has a maximum value proportional to said magnetic attraction produced between said stator yoke and said rotor magnet.

2. A motor according to claim 1, wherein said stator yoke includes a plate of said magnetic material, an insulating layer on said plate, and a wiring pattern on said insulating layer.

3. A motor according to claim 1, wherein said driving coil means includes a plurality of driving coils spaced apart on said stator yoke at locations around said drive shaft.

4. A motor according to claim 3, wherein frictional coupling means is disposed axially between said portions of the first and second clutch members, and said portion of the second clutch member is disposed between said portion of the first clutch member and said stator yoke; and said first and second clutch members are frictionally coupled to each other by way of said frictional coupling means in response to said magnetic attraction acting between said rotor magnet and stator yoke.

5. A motor according to claim 4, further comprising means on said drive shaft for direct rotatable coupling with a tape reel.

6. A motor according to claim 1, wherein said magnetic material includes ferromagnetic material.

7. A motor according to claim 1, wherein said first clutch member is in the form of a rotor of ferromagnetic material, and is included in said rotor assembly.

8. A motor according to claim 1, wherein said first clutch member has a clutch bushing of low friction material by which said first clutch member is mounted for free axial and rotational movements relative to said second clutch member.

* * * * *